US012795408B2

(12) United States Patent
Szigeti et al.

(10) Patent No.: US 12,795,408 B2
(45) Date of Patent: Nov. 10, 2026

(54) REPLICATING TRAFFIC COMMUNICATED OVER SATELLITE NETWORKS

(71) Applicant: Cisco Technology, Inc., San Jose, CA (US)

(72) Inventors: Thomas Szigeti, Vancouver (CA); David John Zacks, Vancouver (CA); Robert Edgar Barton, Richmond (CA); Jeff Apcar, Willoughby (AU)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 18/470,653

(22) Filed: Sep. 20, 2023

(65) Prior Publication Data

US 2025/0097739 A1 Mar. 20, 2025

(51) Int. Cl.

*H04W 24/04* (2009.01)
*H04L 45/24* (2022.01)
*H04W 76/15* (2018.01)
*H04W 84/06* (2009.01)

(52) U.S. Cl.

CPC ............. *H04W 24/04* (2013.01); *H04L 45/24* (2013.01); *H04W 76/15* (2018.02); *H04W 84/06* (2013.01)

(58) Field of Classification Search

None
See application file for complete search history.

(56) References Cited

U.S. PATENT DOCUMENTS 10,826,598 B1 11/2020 Weiner et al.
2015/0333953 A1* 11/2015 Vasseur .................. H04L 45/22 370/228
2018/0270139 A1 9/2018 Singh
2018/0302770 A1* 10/2018 Bhaskaran ............ H04W 76/14
2019/0150080 A1* 5/2019 Davies .............. H04W 28/0252 370/329
2021/0184763 A1 6/2021 Coleman et al.
2021/0367891 A1 11/2021 Roy et al.
2022/0239367 A1 7/2022 Mayer (Continued)

FOREIGN PATENT DOCUMENTS

WO WO2022089324 5/2022

OTHER PUBLICATIONS

Search Report and Written Opinion for International Application No. PCT/2024/047786, Dated Dec. 19, 2024, 14 pages.

*Primary Examiner* — Walter J Divito

(74) *Attorney, Agent, or Firm* — Lee & Hayes, P.C.

(57) ABSTRACT

Techniques for a proxy to replicate traffic being communicated between a client device and a destination device based on determining an outage or impairment in a LEO satellite network. The proxy may be communicating a traffic stream between a source device and a destination device using a primary WAN that includes the LEO satellite network. However, the proxy may determine that the primary WAN has experienced or will experience an outage or other impairment. In such examples, the proxy may then replicate the traffic stream and send the replicated traffic stream over a backup communication link. The backup communication link may a different path through the primary WAN, and/or may be a communication path through a secondary WAN. Once the outage or impairment has cleared, the proxy may stop replicating the traffic and again use the primary WAN to communicate traffic.

17 Claims, 9 Drawing Sheets

(56) References Cited

U.S. PATENT DOCUMENTS

| | | | | |
|---|---|---|---|---|
| 2022/0278743 | A1 | 9/2022 | Chari et al. | |
| 2023/0262806 | A1* | 8/2023 | Gkatzikis .......... | H04W 28/0925 370/329 |

* cited by examiner

REPLICATING TRAFFIC COMMUNICATED OVER SATELLITE NETWORKS

TECHNICAL FIELD

The present disclosure relates generally to replicating communications of data over satellite networks using to enhance availability for users of satellite networks.

BACKGROUND

Wide area networks, or "WANs," are telecommunication networks that connect and enable computing devices to communicate over large geographic areas. Computing devices use WANs, such as the Internet, to communicate with each other over large distances on a daily basis. Generally, WANs are used to connect local area networks (LANs) with each other using edge or border routers, which are devices that route packets over lines that span between LAN locations. A classic example of a use case for a WAN is to connect an enterprise LAN network over a large geographic area to services hosted in a datacenter.

More recently, Software-defined WANs (SD-WANs) have been introduced to help make WAN architectures easier to deploy, operate, and manage. SD-WAN technologies utilize virtualization, application-level policies and overlay networks, and software platforms to increase data-transfer efficiencies across WANs by moving traffic to lower-cost network links to do the work of more-expensive leased lines. Various WAN and SD-WAN technologies are used to communicate data packets between devices and across WANs. For instance, these technologies include packet switching methods, Transport Control Protocol (TCP), Internet Protocol (IP), overlay networks, Multiprotocol Label Switching (MPLS) techniques, and so forth. Using these technologies, a first router can connect a first LAN over a WAN with a second router located within a second LAN.

While WAN networks are effective in delivering network connectivity to most users, there are many users in remote locations, unsupported countries or regions, and/or other areas that do not have reasonable access to WAN networks. Accordingly, various enterprises and organizations have developed and deployed satellite WAN networks that are composed of hundreds or thousands of satellites that orbit earth and that can provide WAN connectivity to many users.

Satellite networks are able to provide WAN connectivity to these remote or unsupported users because all that is required is a satellite dish, a router, and a clear line of sight to one or more of the orbiting satellites. The router uses the satellite dish to transmit satellite signals, or "beams," to an orbiting satellite, which then relays the signal to another satellite in the network and/or another router associated with a destination of the signal. Some of the original satellite communication networks are geosynchronous in operation in that the satellites rotate around the Earth at roughly the same speed as the Earth rotates. However, the original satellite networks were located at a fairly high altitude above the Earth (e.g., 40,000 kilometers (km)), and this resulted in limited bandwidth and poor performance as the round-trip-time was long and limited by the speed of light.

More recently there has been an emergence of Low Earth Orbit (LEO) satellite constellations which are satellite networks that consist of thousands of small satellites in low Earth orbit (e.g., 500 km in altitude). Some of these LEO satellite networks are not geosynchronous, but are constantly moving relative to the Earth, and thus constantly moving relative to routers and satellite dishes on Earth. The satellites in these LEO satellite networks are arranged in a grid (or constellation) that move in unison according to predefined patterns or orbital paths. These LEO satellite networks provide improved bandwidth, reduced latency, and smaller spot coverage due to the closer satellite location as well as the movement of the satellites relative to locations on Earth.

However, users of LEO satellite networks often experience temporary network outages on these links, and these outages can impact productivity and user experience. For example, if a user is on a video conference call, they may lose audio and video for several minutes. This is a common problem faced by LEO satellite subscribers all over the world, and the root causes are complex and most often completely beyond user control.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
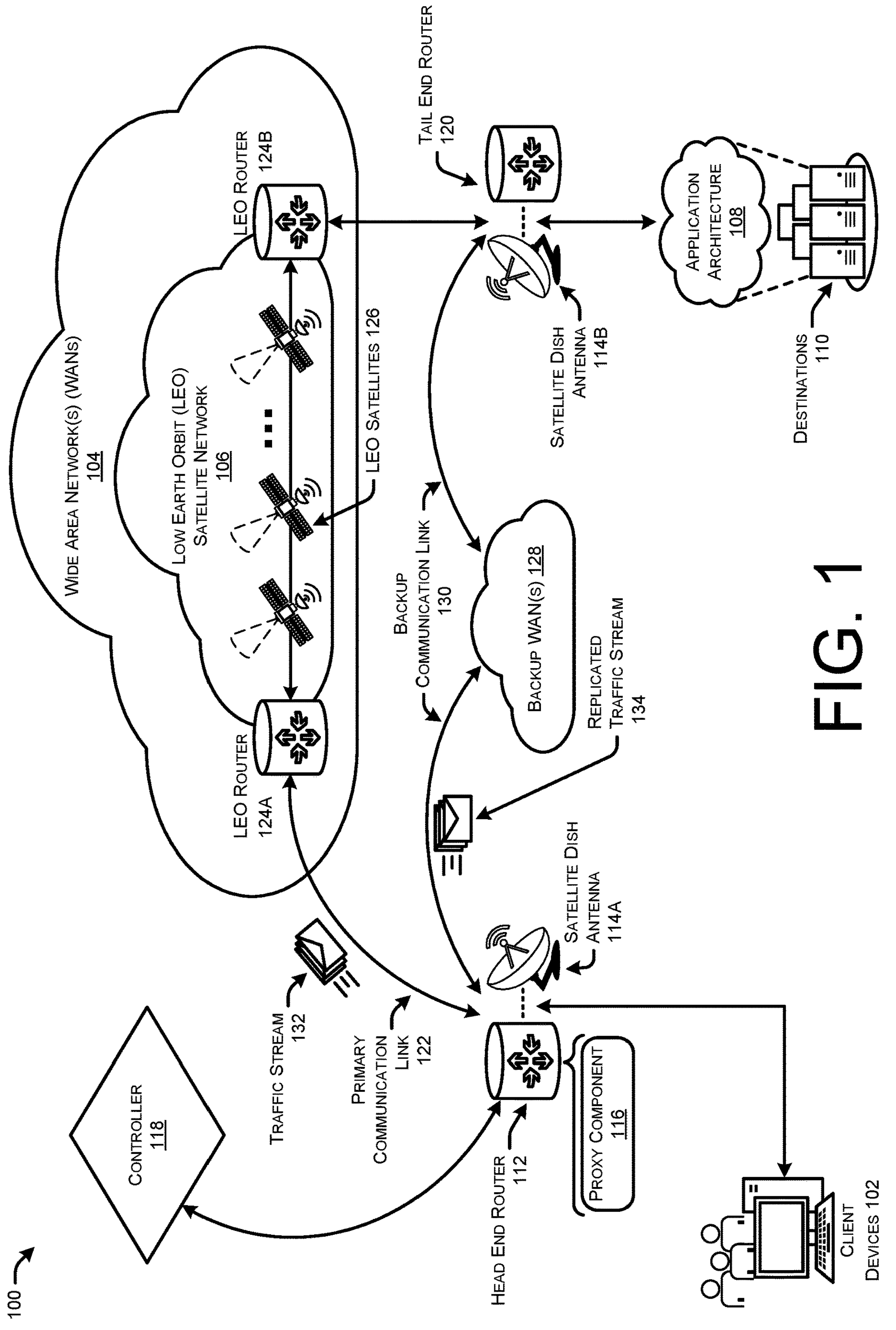
FIG. 1 illustrates a system-architecture diagram in which a head end router uses a WAN that includes a LEO satellite network as a primary communication link for traffic, and uses another WAN as a backup communication link for replicated traffic.

This disclosure describes techniques for a routing device to replicate traffic being communicated between a client device and a destination device based on determining an outage or impairment in a LEO satellite network. A first method to perform techniques described herein includes establishing a primary communication link over a first Wide Area Network (WAN) to communicate data between a first device and a second device, where the first WAN includes a low Earth orbit (LEO) satellite network, and establishing a backup communication link over at least one of the first WAN or a second WAN. Further, the first method includes communicating a traffic stream between the first device and the second device using the primary communication link, and monitoring performance of the primary communication link during communication of the traffic stream to generate performance data. Additionally, the first method includes determining, using the performance data, an outage or impairment associated with the primary communication link, and based at least in part on determining the outage or impairment, replicating a portion of the traffic stream that is to be communicated via the primary communication link to generate a replicated traffic stream. Even further, the first method includes communicating the portion of the traffic stream using the primary communication link during a period of time, and communicating the replicated traffic stream using the backup communication link at least partly during the period of time.

The disclosure may further include a second method comprising establishing, by a tail end router, a primary communication link over a first Wide Area Network (WAN) with a head end router to communicate data between a first device and a second device, the first WAN including a low Earth orbit (LEO) satellite network. Further, the second method may include establishing a backup communication link, by the tail end router and with the head end router, over at least one of the first WAN or a second WAN. The second method may include receiving a traffic stream via the primary communication link, and a replicated traffic stream via the backup communication link. In some instances, first packets of the traffic stream may be encapsulated with first replication wrappers including a source identifier (ID) associated with the head end router, a replication ID associated with a replication session on the head end router, the replication session including the traffic stream and the replicated traffic stream, and a replication counter values that indicate first relative positions for each of the first packets in the traffic session. Additionally, second packets of the replicated traffic stream may be encapsulated with second replication wrappers including the source ID, the replication ID associated with a replication session on the head end router, and the replication counter values that indicate second relative positions for each of the second packets in the replicated traffic stream. The second method may further include receiving, at a tail end router, the first packets of the traffic stream and the second packets of the replicated traffic stream, identifying, at the tail end router, a first replication counter value in a first replication wrapper of a first packet, and forwarding, from the tail end router, the first packet of the first packets to the second device. Additionally, the second method may include storing an indication that the first packet having the first replication counter value was forwarded from the remote router and to the second device, identifying the first replication counter value in a second replication wrapper of a second packet, and dropping the second packet based at least in part on the indication that the first packet having the first replication counter value was forwarded from the remote router and to the second device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for a proxy to replicate traffic being communicated between a client device and a destination device based on determining an outage or impairment in a LEO satellite network. The proxy may be communicating a traffic stream between a source device and a destination device using a primary WAN that includes the LEO satellite network. However, the proxy may determine that the primary WAN has experienced or will experience an outage or other impairment. In such examples, the proxy may then replicate the traffic stream and send the replicated traffic stream over a backup communication link. The backup communication link may a different path through the primary WAN, and/or may be a communication path through a secondary WAN. Once the outage or impairment has cleared, the proxy may stop replicating the traffic and again use the primary WAN to communicate traffic.

In LEO satellite networks, the locations of satellites constantly change relative to Earth during the day as they traverse their predefined and patterned orbital paths. These satellites traverse patterned orbital paths such that their location at different times of the day relative to locations on Earth is known or predictable. Since the LEO satellites travel in a predictive manner, some or all of the outages and performance issues may be predictable. For instance, WAN routers, a network controller, or another orchestration entity may collect or receive telemetry data for traffic streams communicated over WANs that include LEO satellite networks. The controller may identify patterns in the telemetry data that indicate outages, impairments, or performance issues for communicating over the LEO satellite networks. The controller may collect telemetry data (e.g., packet loss data, latency data, congestion data, etc.) for communication streams communicate by devices at different geolocations on Earth. The performance and patterns experienced by devices at the different geolocations may differ as the satellite locations and paths differ relative to the geolocations of devices on Earth.

The controller may analyze the telemetry data collected from devices that communicate data streams over the LEO satellite networks at different times of the day and from different geolocations on Earth. The controller may generate location-specific, predictive models that can be used by devices on Earth to predict or determine when they can expect outages or performance issues when communicating over the LEO satellite network at different times in the day, week, or other period of time. The controller may provide these predictive models to devices on Earth that transmit data streams over the LEO satellite networks.

To communicate using LEO satellite networks, client devices generally need to send the data they would like communicated to a WAN router that utilizes a satellite dish to transmit signals to a satellite in the LEO satellite network. In some examples, a provider or controller or the LEO satellite network may provide users, often customers, with the required routers and/or satellite dishes to enable users to communicate over the LEO satellite network using their client devices. Computing devices, such as client devices, are configured to communicate over WANs using the TCP/IP suite of communication protocols. However, the computing devices are generally only configured to communicate over WANs using a single traffic stream. In such cases, the client devices may experience performance degradation when communicating over LEO satellite networks that are experiencing outages or impairments.

According to the techniques described herein, a proxy may be deployed onto the WAN routers, or the client devices themselves, in order to replicate traffic streams communicated by the client devices and send the replicated traffic streams over backup communication paths. Generally, the proxy running on the WAN router maintains at least two communication links, one is a primary communication link that is over a LEO satellite network path, and a backup communication link over another LEO satellite network path or an alternative WAN technology (e.g., cellular networks, terrestrial WAN(s), etc.). In some examples, the WAN routers may have or operate with a dual antenna system that allows the WAN routers to connect simultaneously with two LEO satellites (e.g., to help with hand-off as the satellite passes over the sky).

The proxy may continuously monitor the performance over the available links, and this performance data may be used to baseline each link and determine when impairments exist (e.g., packet drops, sustained increases in latency, sustained congestion, etc.). This may be considered a reactive approach. In some instances, the proxy may utilize the predictive models, and/or an onboard machine-learning (ML) system to determine any patterns that may exist for the impairments and outages and predict these in the future according to learned patterns.

In normal operation, the traffic coming into the WAN router for transmission will traverse the primary communication link via the LEO satellite network. However, in instances where the proxy identifies or predicts that an outage or impairment (e.g., confidence beyond a variable threshold) is likely to occur, the proxy may replicate some or all of the traffic stream and the replicated traffic stream is then communicated over the backup communication link. In some instances, the backup communication link may be a different WAN that the primary WAN, such as a cellular network or another less desirable link. The proxy may continue to transmit the traffic stream over the primary communication link, and also transmit the replicated traffic stream over the backup communication link.

In some instances, the proxy may replicate the traffic streams by encapsulating the traffic into a replication wrapper using an encapsulation protocol, such as Virtual Extensible LAN (VXLAN), Generic Protocol Extension for VXLAN (VXLAN-GPE), and/or Generic Routing Encapsulation (GRE). The replication wrapper will provide a replication source identifier (ID) (e.g., a loopback IP address on the source WAN router), a replication-ID (unique per replication session on the source router), and a replication counter value. Generally, the replication counter value constantly increments per-encapsulated-packet and indicates the relative position of the particular encapsulated packet within the replication session.

The replication sessions themselves may be unidirectional in nature, but can also be bi-directional if both sides determine that replication is required. The replication IDs may be locally significant, and may be paired with a source-ID such that the combination of source-ID and replication-ID are globally unique. In some instances, the replication-IDs are allocated at source in a constantly-incrementing fashion with a field length long enough to avoid reuse within any practical timeframe (e.g., 32 bits or more).

At the receiving WAN router, or "tail end" router, either one or two copies of the traffic stream and the replicated traffic stream are received from the source router, or "head end" router, when a proxy replication session is underway. The tail end router may simply use packets from one of the two (or more) replicated streams that arrive first, de-encapsulating it and sending the original packet along to its destination. In examples where a second copy of the same encapsulated packet (determinable from its combined source-ID, replication-ID, and replication counter values), it may simply be discarded. The tail end router may maintain or collect telemetry data indicating that a packet was received but dropped, or that a packet was not received, to improve the efficacy of the system. These techniques may be used in operation with unicast, multicast, and broadcast traffic flows, and ensures that only a single copy of the packet is delivered to the ultimate destination node for that traffic. In this way, the actual source device and destination device do not need to be reconfigured to implement these techniques, and proxies running on the routers (or other intermediate devices) may perform the replication techniques described herein.

Additionally, the setup and teardown of replication sessions is lightweight and may require no explicit signaling. The appearance and presence of encapsulated traffic in the data lane may be used to indicate that a replication session has started, and a timeout threshold on receiving such encapsulated traffic may be used to indicate to the tail end router that the replication session has stopped. This lightweight method may help avoid complicated session negotiation because all of the necessary data for the replication session (source-ID, replication-ID, and replication sequence numbering) can be derived from the encapsulated traffic itself in the data plane. The arrival of encapsulated traffic at a decapsulating router thus signals the start of a new replication session (assuming the source-ID+replication-ID pair has not previously been matched). Which of the WAN routers that received the encapsulated data and should encapsulate and de-encapsulate the traffic is configurable by policy.

Since the decapsulating side of the replication router pairing (the tail end router) observes all of the received traffic for the session, the tail end router may then observe which traffic was replicated but did not require replication (i.e., two or more copies of the packet with the same encapsulated source-ID+replication-ID+replication counter values received), and which traffic was replicated and required it (i.e., only one copy of the encapsulated packet received). This data can then be aggregated to the controller, which can use the results to determine if the replication was both needed and effective, or not. This can be factored into the prediction models and algorithms to further refine whether, and when, to replicate the traffic for more optimal results (i.e., balancing out excessive replicated traffic flows vs. packet loss/excessive delay), as well as being used as a mechanism to inform the head end router (via the controller) to cease traffic replication when this capability is no longer deemed to be required.

Generally, the traffic may be proactively replicated not just on observed or predicted traffic loss, but also could be replicated based on excessive delay, jitter, or other observed factors. For example, a policy could be created which indicates that voice and video traffic should be able to transit the network end-to-end with less than some threshold delay, such as 150 milliseconds (ms) of delay. In examples where that delay is exceeded, or predicted to be exceeded in future, traffic replication may be initiated to an alternate path that is more in line with the desired policy for traffic handling. Once the primary path returns to normal operation, the replication involved could cease.

In some examples, the proxy replication techniques may be applied to all of the traffic traversing head end nodes. However, in some instance the proxy replication techniques can be applied to only to a defined subset of that traffic, based on a replication policy. For example, by using mechanisms such as traffic analytics, deep packet inspection (DPI) on traffic flows, or signaling to the router from other endpoints, systems, or controllers, specific flows of traffic could be defined which are "replication-relevant" flows for which the predictive traffic replication service may be applied. Other, less-relevant flows may be allowed to drop during the traffic interruption interval on the primary link, pending reconvergence. This can assist in ensuring that only the most important traffic streams of flows are replicated during an outage, avoiding overloading the backup link should it be of less capacity (or much subject to cost-for-use structures) than the primary LEO satellite communication link.

Although the techniques described herein are primarily with respect to LEO satellite networks, the techniques are equally applicable for other networks as well that may experience intermittent or periodic outages or impairments. Further, although the techniques are described with reference to a WAN router running the proxy, the proxy could be located anywhere between the client device and a satellite in a LEO satellite network, including the client device itself. Further, in some instances, rather than training and using model(s) that have been trained using historical telemetry data, the proxy may instead (or in addition to) engage the proxy functionality based on where the satellites are going to be and the measure performance on the group.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example in which a head end router uses a WAN that includes a LEO satellite network as a primary communication link for traffic, and uses another WAN as a backup communication link for replicated traffic.

The system-architecture diagram 100 illustrates one or more client devices 102 that are configured to communicate over one or more WANs 104 that includes a LEO satellite network 106 with one or more destinations 110, such as an application architecture 108, user devices, network devices, Internet-of-things (IoT) devices, and/or any other computing device. The client devices 102 and/or destinations 110 may comprise any type of device configured to communicate using various communication protocols (e.g., short range protocols, LAN protocols, WLAN protocols, TCP/IP, User Datagram Protocol (UDP), tunneling protocols, and/or any other protocol) over various networks. For instance, the client devices 102 and/or destinations 110 may comprise one or more of personal user devices (e.g., desktop computers, laptop computers, phones, tablets, wearable devices, entertainment devices such as televisions, etc.), network devices (e.g., servers, routers, switches, access points, etc.), and/or any other type of computing device.

The WAN 104 and WAN 128 may include one or more networks implemented by any viable communication technology, such as wired and/or wireless modalities and/or technologies. The WAN 104 and WAN 128 may each include or connect any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.)—both centralized and/or distributed—and/or any combination, permutation, and/or aggregation thereof. The WAN 104 and WAN 128 may include devices, virtual resources, or other nodes that relay packets from one network segment to another by nodes in the computer network.

As illustrated, the WAN 104 may include a LEO satellite network 106 that includes a plurality of LEO satellites 126 (e.g., hundreds or thousands of satellites). The small satellites in the LEO satellite network 106 may consist of thousands of small satellites in low Earth orbit (e.g., 500 km in altitude). The LEO satellite network 106 may be constantly moving relative to the Earth, and thus constantly moving relative to the head end router 112 and tail end router 120, as well as satellite dishes 114A and 114B, on Earth. The satellites 126 in the LEO satellite network 106 may be arranged in a grid (or constellation) and move in unison according to predefined patterns or orbital paths. These LEO satellite network 106 may provide improved bandwidth, reduced latency, and smaller spot coverage due to the closer satellite 126 location as well as the movement of the satellites 126 relative to locations on Earth. Because the speed of light propagates faster in a vacuum, such as outer space, the satellites 126 in the LEO satellite network 106 may handoff signals between the satellites 126 until the signals reach a satellite 126 closer to the destination device on Earth for transmission back to Earth. In some examples, the satellites may be 126 in a grid that moves according orbital paths, and in such examples, the distances between the satellites 126 are constantly becoming shorter or longer as the satellites 126 move along their respective paths.

To communicate over LEO satellite network 106, the client devices 102 generally need to send the data they would like communicated to a head end router 112 that utilizes a satellite dish 114A to transmit signals to a satellite 126 in the LEO satellite network 106. In some examples, a provider or controller or the LEO satellite network 106 may provide users, often customers, with the required routers 112/120 and/or satellite dishes 114 to enable users to communicate over the LEO satellite network 106 using their client devices 102.

In some architectures or embodiments, the controller 118 may receive and analyze telemetry data collected from the head end routers 112 and tail end routers 120 that communicate over the LEO satellite network 106. For instance, the controller 118 (or other entity, including the head end router 112 and/or tail end router 120) may collect or receive telemetry data for traffic streams 132 communicated over WANs 104 that include LEO satellite networks 106. The controller 118 may identify patterns in the telemetry data that indicate outages, impairments, or performance issues for communicating over the LEO satellite networks 106. The controller 118 may collect telemetry data (e.g., packet loss data, latency data, congestion data, etc.) for communication streams communicate by devices at different geolocations on Earth. The performance and patterns experienced by devices at the different geolocations may differ as the satellite locations and paths differ relative to the geolocations of devices on Earth. For instance, the head end router 112 and/or tail end router 120 may monitor characteristics such as round-trip-time (RTT), packet loss, latency, available bandwidth, jitter, and/or other characteristics indicative of network performance. The telemetry data may be timestamped based on when it was generated, and the head end router 112 and/or tail end router 120 may send the telemetry data, timestamp data, geolocation data indicating a geolocation of the head end router 112 and/or tail end router 120, and an indication of the communication link that was used to communicate to the connection-analytics service.

With many users across the Earth using the LEO satellite network 106, and those users having different client devices 102 that are configured to communicate using different communication links, the controller 118 is able to determine how well different communication links perform for different geographic locations and at different times of the day. The controller 118 may analyze the telemetry data, geographic data, timestamp data, and performance data used to generate models (e.g., machine-learning (ML) models, rule-based models, etc.) that indicate when the communication links through the LEO satellite networks 106 are optimal for use based on the time of day and/or geographic location.

The controller 118 may provide schedules or models to the head end routers 112 that indicate whether a traffic stream 132 needs to be replicated due to predicted poor performance in a primary communication link based on the geographic location of the head end routers 112 and/or the time of day. The head end routers 112 may simply utilize these schedules or models to determine, based on their geolocation and the time of day (and/or other parameters), what whether the traffic stream 132 needs to be replicated and transmitted over a backup WAN 128. Additionally, or alternatively, the head end router 112 may take into account the type of content being transmitted on behalf of the client device 102 to determine whether traffic streams 132 are to be replicated or not.

An application on the client device 102 may cause the client device 102 to establish a primary communication link 122 over the WAN(s) 104 and the LEO satellite network 106. The head end router 112 may be executing a proxy component 116 that is configured to determine, using various rules and/or models, whether or not the traffic stream 132 being communicated over the primary communication link 122 needs to be replicated. In examples where the primary communication link 122 is not experiencing, or expecting to experience, outages or impairments in connectivity, the proxy component 116 may simply allow the client device 102 to communicate over the LEO satellite network 106 per usual via the primary communication link 122.

However, in some instances the proxy component 116 may determine that the primary communication link 122 is experiencing, or is predicted to experience, an outage or impairment. The proxy component 116 (or simply proxy 116) running on the head end router 112 maintains at least two communication links, one is the primary communication link 122 that is over a LEO satellite network 106, and a backup communication link 130 over a backup WAN 128, such as another LEO satellite network path or an alternative WAN technology (e.g., cellular networks, terrestrial WAN(s), etc.). In some examples, the head end router 112 and tail end router 120 may have or operate with a dual antenna system that allows the routers to connect simultaneously with two LEO satellites 126 (e.g., to help with hand-off as the satellite passes over the sky).

The proxy component 116 may continuously monitor the performance over the available links, and this performance data may be used to baseline each link and determine when impairments exist (e.g., packet drops, sustained increases in latency, sustained congestion, etc.). This may be considered a reactive approach. In some instances, the proxy component 116 may utilize the predictive models, and/or an onboard ML system to determine any patterns that may exist for the impairments and outages and predict these in the future according to learned patterns.

In normal operation, the traffic coming into the head end router 112 for transmission will traverse the primary communication link 122 via the LEO satellite network 106. However, in instances where the proxy component 116 identifies or predicts that an outage or impairment (e.g., confidence beyond a variable threshold) is likely to occur, the proxy component 116 may replicate some or all of the traffic stream 132 and a replicated traffic stream 134 is then communicated over the backup communication link 130. In some instances, the backup communication link 130 may be on a backup WAN 128 that is different than the WAN 104, such as a cellular network or another less desirable link. However, the backup WAN 128 may in some examples be the same as the WAN 104 or include the LEO satellite network 106 and simply be a different communication link. The proxy component 116 may continue to transmit the traffic stream 132 over the primary communication link 122, and also transmit the replicated traffic stream 134 over the backup communication link 130.

The tail end router 120 may also be executing a receiving proxy component that corresponds to the proxy component 116 and performs functionality to implement this invention. The receiving proxy component running on the tail end router 120 may determine whether one or two copies of the traffic stream 132 and the replicated traffic stream 134 are received from the head end router 112, when a proxy replication session is underway. The tail end router 120 may simply use packets from one of the two (or more) replicated streams that arrive first, de-encapsulating it and sending the original packet along to its destination 110. In examples where a second copy of the same encapsulated packet (determinable from its combined source-ID, replication-ID, and replication counter values), it may simply be discarded. The tail end router 120 may maintain or collect telemetry data indicating that a packet was received but dropped, or that a packet was not received, to improve the efficacy of the system. These techniques may be used in operation with unicast, multicast, and broadcast traffic flows, and ensures that only a single copy of the packet is delivered to the ultimate destination node for that traffic. In this way, the actual source device and destination device do not need to be reconfigured to implement these techniques, and proxies running on the routers (or other intermediate devices) may perform the replication techniques described herein.

In examples were the destination 110 is the application architecture 108, the application architecture 108 may include devices houses or located in one or more data centers that may be located at different physical locations. For instance, the application architecture 108 may be supported by networks of devices in a public cloud computing platform, a private/enterprise computing platform, and/or any combination thereof. The one or more data centers may be physical facilities or buildings located across geographic areas that designated to store networked devices that are part of the application architecture 108. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

Figure 2:
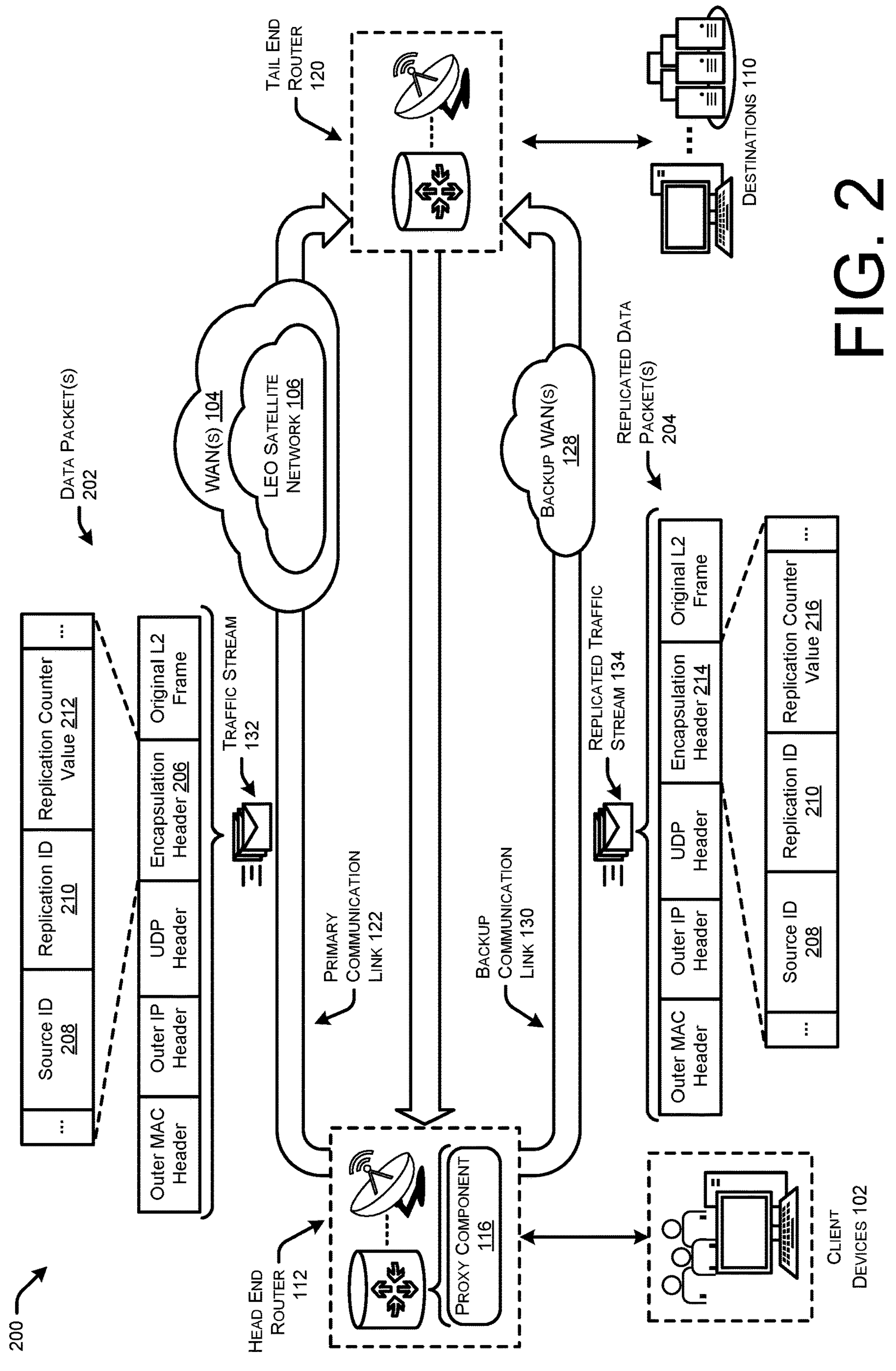
FIG. 2 illustrates a system-architecture diagram of example information included in headers of data packets in a traffic stream and replicated traffic stream.

FIG. 2 illustrates a system-architecture diagram 200 of example information included in headers of data packets in a traffic stream 132 and a replicated traffic stream 134. As shown, the traffic stream 132 includes one or more data packets 202. In the illustrative example, the data packets 202 may include an outer MAC header, an outer IP header, a UDP header, and an original layer 2 frame. According to the techniques described herein, the data packets 202 may further include an encapsulation header 206. Similarly, the replicated traffic stream 134 includes one or more replicated data packets 204. In the illustrative example, the data packets 204 may include an outer MAC header, an outer IP header, a UDP header, and an original layer 2 frame.

As shown, the data packets 202 of the traffic stream may each include an encapsulation header 206 (also referred to herein as a replication wrapper) that includes various information, including a source ID 208, replication ID 210, and a replication counter value 212. The proxy component 116 may encapsulate the traffic stream 132 with the encapsulation header 206 using an encapsulation protocol, such as VXLAN, VXLAN-GPE, and/or GRE. The replication wrapper, or encapsulation header 206, will provide the replication source ID 208, such as a loopback IP address on the head end router 112. The encapsulation header 206 may further include the replication ID 210 that is unique on a per-replication-session basis for the head end router 112. Additionally, the encapsulation header 206 may include the replication counter value 212. Generally, the replication counter value 212 continuously increments for each data packet 202 and on a per-encapsulated-packet in order to indicate the relative position of the particular encapsulated packet within the replication session.

The proxy component 116 may replicate the traffic stream using any replication techniques, and encapsulate the replicated traffic stream 134 with the encapsulation header 214 using an encapsulation protocol, such as VXLAN, VXLAN-GPE, and/or GRE. The replication wrapper, or encapsulation header 214, generally corresponds to the encapsulation header 206 and include the replication source ID 208, such as a loopback IP address on the head end router 112. The encapsulation header 214 may further include the replication ID 210 that is unique on a per-replication-session basis for the head end router 112. Additionally, the encapsulation header 214 may include the replication counter value 216. Generally, the replication counter value 216 continuously increments for each data packet 202 and on a per-encapsulated-packet in order to indicate the relative position of the particular encapsulated packet within the replication session.

Using the source ID 208 and replication ID 210 found in each of the encapsulation header 206 and encapsulation header 214, the tail end router 120 is able to determine that the traffic stream 132 and replicated traffic stream 134 are part of the same replication session on the head end router 112.

Figure 3:
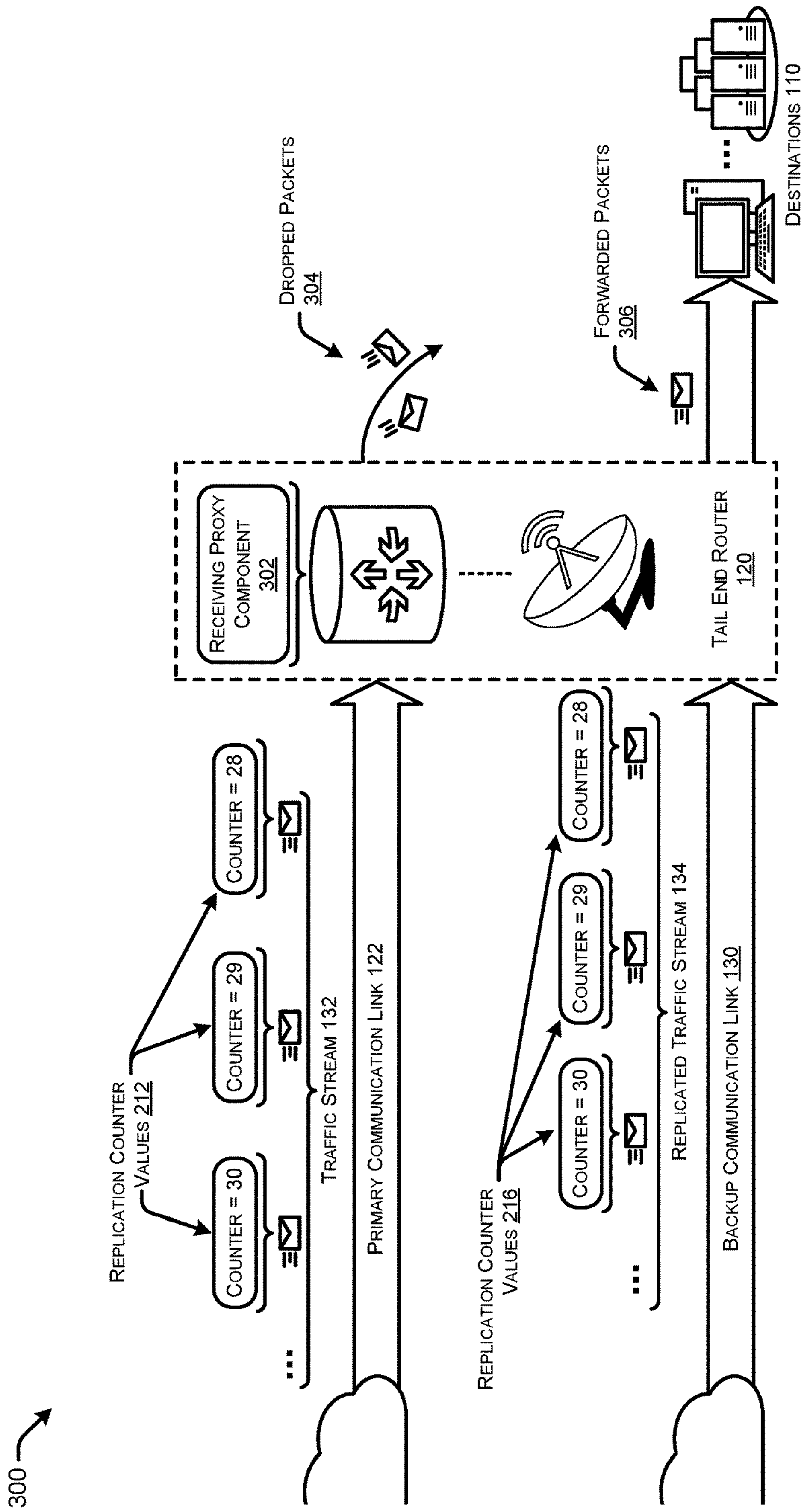
FIG. 3 illustrates a system-architecture diagram in which a tail end router drops packets of a traffic stream based on having already receiving the packets in a replicated traffic stream.

FIG. 3 illustrates a system-architecture diagram 300 in which a tail end router 120 drops packets of a traffic stream based on having already receiving the packets in a replicated traffic stream.

As shown, the data packets 202 in the traffic stream 132 each include respective replication counter value 212 (e.g., 28, 29, 30, etc.). Similarly, the replicated data packets 204 each include respective replication counter value 212 (e.g., 28, 29, 30, etc.). The receiving proxy component 302 running on the tail end router 120 may receive the data packets 202 and data packets 204 and decide which of the data packets to forward, or drop. Generally, the receiving proxy component 302 may receive a data packet and determine if it has received that data packet yet in a replicated traffic stream. For instance, the receiving proxy component 302 may identify the source ID 208, replication ID 210, and replication counter value to determine if it has already received a data packet with that information and forward it on. The receiving proxy component 302 may, in this example, receive the data packets 204 of the replicated traffic stream 134 first and forward those packets on to the destination as forwarded packet 306. The receiving proxy component 302 may later determine that the replicated/corresponding data packets 202 in the traffic stream are received, and decide to drop those packets as dropped packets 304 because the corresponding packets in the other stream were already forwarded on as forwarded packets 306.

Since the decapsulating side of the replication router pairing (the tail end router 120) observes all of the received traffic for the session, the tail end router 120 may then observe which traffic was replicated but did not require replication (i.e., two or more copies of the packet with the same encapsulated source-ID+replication-ID+replication counter values received), and which traffic was replicated and required it (i.e., only one copy of the encapsulated packet received). This data can then be aggregated to the controller 118, which can use the results to determine if the replication was both needed and effective, or not. This can be factored into the prediction models and algorithms to further refine whether, and when, to replicate the traffic for more optimal results (i.e., balancing out excessive replicated traffic flows vs. packet loss/excessive delay), as well as being used as a mechanism to inform the head end router (via the controller) to cease traffic replication when this capability is no longer deemed to be required.

Figure 4:
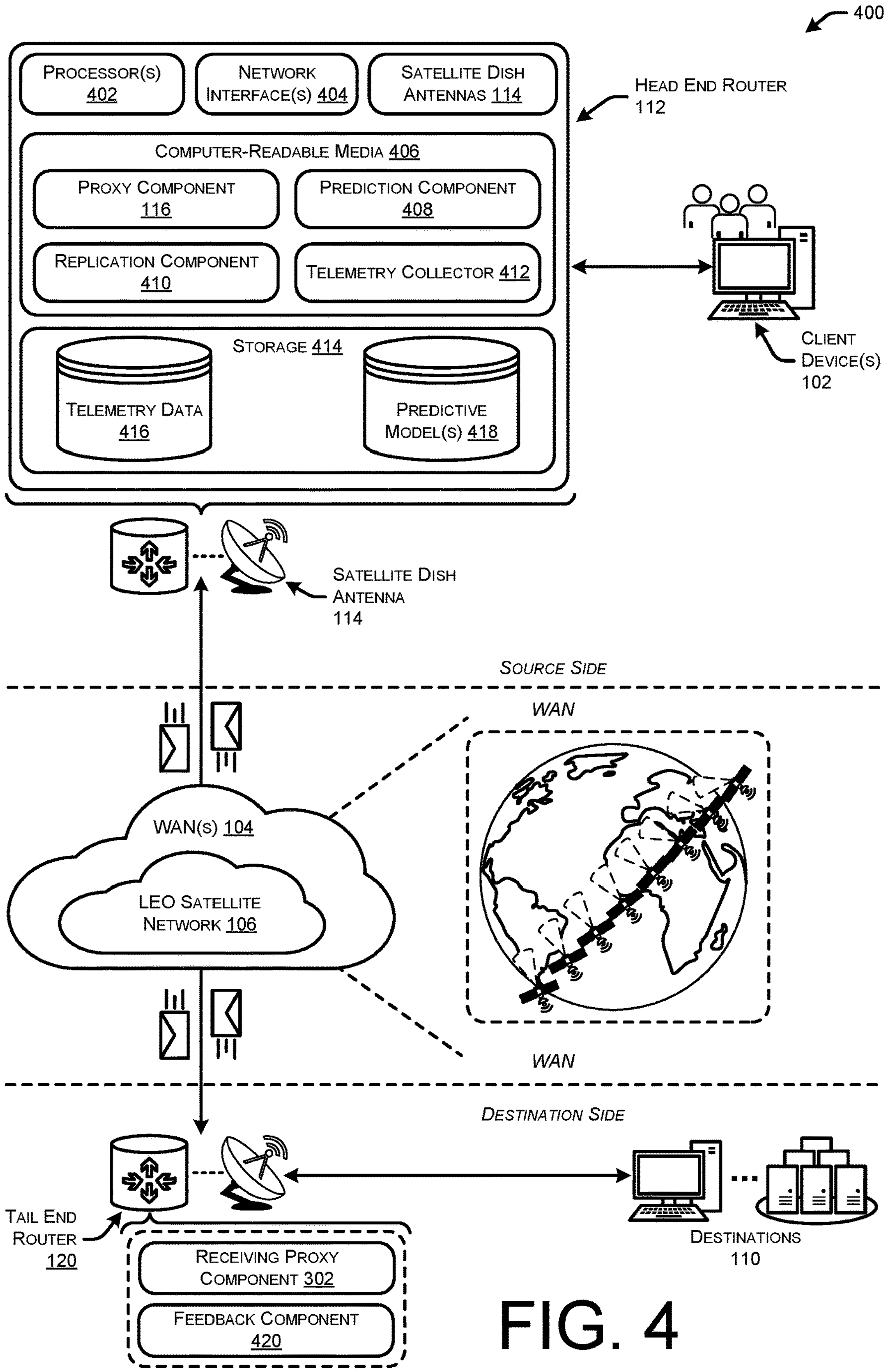
FIG. 4 illustrates a component diagram of an example head end router that determines to replicate a traffic stream and communicate the replicated traffic stream over a backup WAN and to a tail end router.

FIG. 4 illustrates a component diagram 400 of an example head end router 112 that determines to replicate a traffic stream 132 and communicate the replicated traffic stream 134 over a backup WAN 128 and to a tail end router 120.

Although illustrated as a router, such as a WAN router, the head end router 112 may be any device or component configured to communicate (either directly or via another device) over a LEO satellite network 106. As illustrated, the head end router 112 may include one or more hardware processors 402 (processors), one or more devices, configured to execute one or more stored instructions. The processor(s) 402 may comprise one or more cores. Further, the head end router 112 may include one or more network interfaces 404 configured to provide communications between the head end router 112 and other devices, such as the client devices 102, LEO satellites 126, and/or other devices and systems or devices. The network interfaces 404 may include devices configured to couple to personal area networks (PANs), wired and wireless local area networks (LANs), wired and wireless wide area networks (WANs), and so forth. In some instances, the head end router 112 may include one or more internal satellite dish antennas 114, and in other examples, the head end router 112 may be communicatively coupled to one or more stand-alone satellite dish antennas 114. In some instances, the head end router 112 may include or be associated with two or more satellite dish antennas 114 to communicate two or more traffic streams over one or more LEO satellite networks 106.

The head end router 112 may also include computer-readable media 406 that stores various executable components (e.g., software-based components, firmware-based components, etc.). The computer-readable media 406 may further store or be used to execute components to implement functionality described herein. While not illustrated, the computer-readable media 406 may store one or more operating systems utilized to control the operation of the one or more components of the head end router 112. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the head end router 112 may include storage 414 which may comprise one, or multiple, repositories or other storage locations for persistently storing and managing collections of data such as databases, simple files, binary, and/or any other data. The storage 414 may include one or more storage locations that may be managed by one or more database management systems.

The computer-readable media 406 may store portions, or components, of the head end router 112 described herein. For instance, the computer-readable media 406 may store the proxy component 116 described herein, as well as a prediction component 408 that uses one or more predictive models 418 to predict whether, and/or when, a traffic stream 132 is to be replicated. In some instances, a telemetry collector 412 may continuously monitor the performance over the available links, and this telemetry data 416 may be stored in the storage 414. The telemetry collector 412 may monitor communications and sessions and determine or collect telemetry data 416 which may include, as non-limiting and non-exhaustive examples, round-trip-time (RTT), packet loss, latency, available bandwidth, jitter, and/or other characteristics indicative of network performance. The telemetry data 416 may be timestamped based on when it was generated, and the head end router 112 may send, to the controller 118, the telemetry data 416 along with at least timestamp data, geolocation data indicating a geolocation of the head end router 112, and an indication of the communication link that was used to communicate over the LEO satellite network 106. In some instances, the head end routers 112 may also provide other attributes, such as a length of time of the communication session, type(s) of data communicated (e.g., audio, video, etc.), and/or other attributes.

The controller 118 may analyze the telemetry data 416 collected from the head end routers 112 and other devices that communicate data streams over the LEO satellite networks 106 at different times of the day and from different geolocations on Earth. The controller 118 may generate location-specific, predictive models 418 that can be used by devices on Earth to predict or determine when they can expect outages or performance issues when communicating over the LEO satellite network 106 at different times in the day, week, or other period of time. The controller 118 may provide these predictive models 418 to devices on Earth that transmit data streams over the LEO satellite networks.

In some instances, the prediction component 408 may use the telemetry data 416 to baseline each link and determine when impairments exist (e.g., packet drops, sustained increases in latency, sustained congestion, etc.). This may be considered a reactive approach. In some instances, the prediction component 408 may utilize the predictive models 418, and/or an onboard ML system to determine any patterns that may exist for the impairments and outages and predict these in the future according to learned patterns.

The replication component 410 may receive an indication that the primary communication link 122 is going to experience an outage or impairment, and may proactively start replicating the traffic stream 132 prior to, or at approximately, the predicted time at which the outage or impairment is to begin. The prediction component 408 may be configured to predict when replication is unneeded or needed for communicating over a LEO satellite network 106 based on the geolocation of the transmissions, a time of day, and/or other parameters. For instance, the prediction component 408 may use the predictive models 418 to determine, for the location of the head end router 112, when replication is deemed necessary at different times of the day.

As illustrated, the tail end router 120 may include a feedback component 420 that collects feedback regarding the performance of, and need for, the replicated traffic stream 134. The tail end router 120 may determine whether one or two copies of the traffic stream and the replicated traffic stream are received from the head end router 112, when a proxy replication session is underway. The tail end router 120 may simply use packets from one of the two (or more) replicated streams that arrive first, de-encapsulating it and sending the original packet along to its destination. In examples where a second copy of the same encapsulated packet (determinable from its combined source-ID, replication-ID, and replication counter values), it may simply be discarded. The tail end router 120 may maintain or collect telemetry data indicating that a packet was received but dropped, or that a packet was not received, to improve the efficacy of the system. The controller 118 can then determine whether the replication was necessary (e.g., only receiving one packet), or if there are times when replication was not needed (e.g., two packets were received, the traffic stream 132 packets were received first, etc.).

Additionally, the setup and teardown of replication sessions is lightweight and may require no explicit signaling to the tail end router 120. The appearance and presence of encapsulated traffic in the data lane may be used to indicate that a replication session has started, and a timeout threshold on receiving such encapsulated traffic may be used to indicate to the tail end router 120 that the replication session has stopped. This lightweight method may help avoid complicated session negotiation because all of the necessary data for the replication session (source-ID, replication-ID, and replication sequence numbering) can be derived from the encapsulated traffic itself in the data plane. The arrival of encapsulated traffic at the tail end router 120 thus signals the start of a new replication session (assuming the source-ID+replication-ID pair has not previously been matched). Which of the WAN routers that received the encapsulated data and should encapsulate and de-encapsulate the traffic is configurable by policy.

Since the decapsulating side of the replication router pairing (the tail end router 120) observes all of the received traffic for the session, the feedback component 420 may then observe which traffic was replicated but did not require replication (i.e., two or more copies of the packet with the same encapsulated source-ID+replication-ID+replication counter values received), and which traffic was replicated and required it (i.e., only one copy of the encapsulated packet received). This data can then be aggregated to the controller 118, which can use the results to determine if the replication was both needed and effective, or not. This can be factored into the prediction models 418 and algorithms to further refine whether, and when, to replicate the traffic for more optimal results (i.e., balancing out excessive replicated traffic flows vs. packet loss/excessive delay), as well as being used as a mechanism to inform the head end router 112 (via the controller 118) to cease traffic replication when this capability is no longer deemed to be required.

In some examples, the proxy replication techniques may be applied to all of the traffic traversing head end nodes. However, in some instance the proxy replication techniques can be applied to only to a defined subset of that traffic, based on a replication policy. For example, by using mechanisms such as traffic analytics, deep packet inspection (DPI) on traffic flows, or signaling to the router from other endpoints, systems, or controllers, specific flows of traffic could be defined which are "replication-relevant" flows for which the predictive traffic replication service may be applied. Other, less-relevant flows may be allowed to drop during the traffic interruption interval on the primary link, pending reconvergence. This can assist in ensuring that only the most important traffic streams of flows are replicated during an outage, avoiding overloading the backup link should it be of less capacity (or much subject to cost-for-use structures) than the primary LEO satellite communication link.

Figure 5:
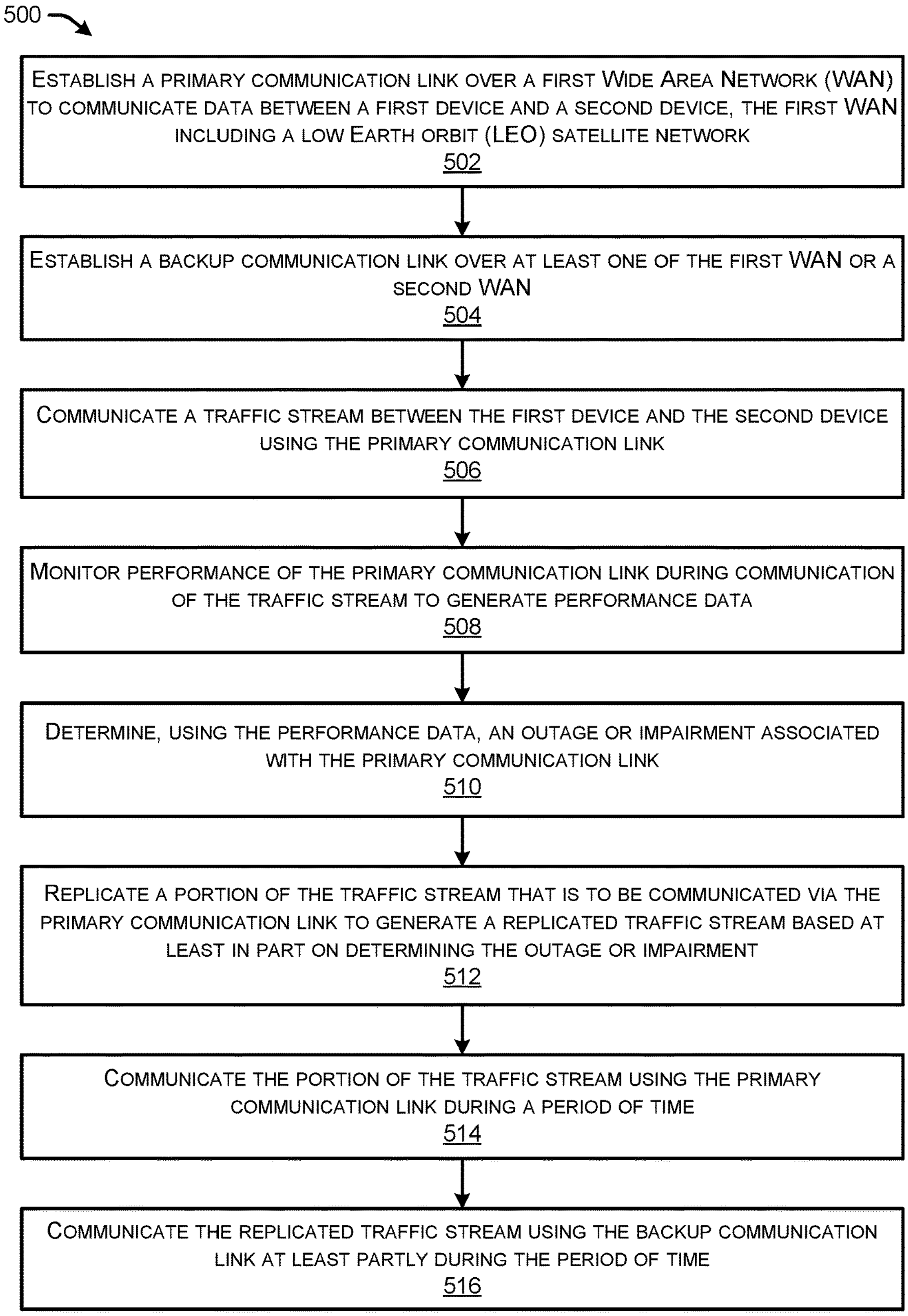
FIG. 5 illustrates a flow diagram of an example method for a router to replicate a traffic stream and communicate the traffic streams over different communication paths and to a tail end router.
Figure 6:
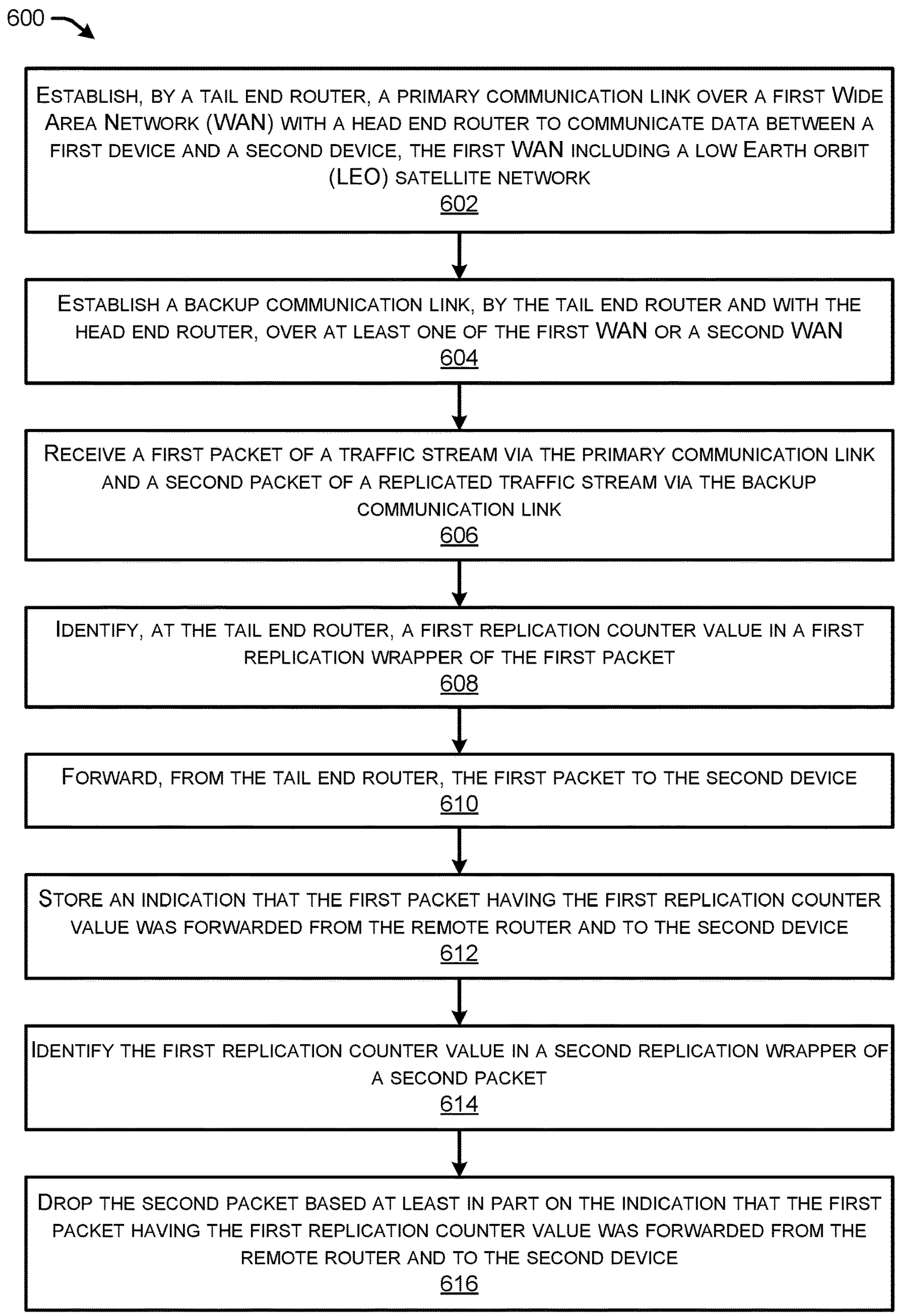
FIG. 6 illustrates a flow diagram of an example method for a router to receive a traffic stream and a replicate traffic stream and determine which packets to forward to a destination.

FIGS. 5 and 6 illustrate flow diagrams of an example methods 500 and 600 that illustrates aspects of the functions performed at least partly by the devices as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 5 illustrates a flow diagram of an example method for a router to replicate a traffic stream and communicate the traffic streams over different communication paths and to a tail end router. In some examples, the steps of method 500 may be performed, at least partly, by a head end router 112 as described herein. The head end router 112 may utilize a satellite dish antenna 114 and may include one or more processors and one or more non-transitory computer-readable media storing computer-executable instructions that, when executed by the one or more processors, cause the one or more processors to perform the operations of method 500.

At 502, the head end router 112 may establish a primary communication link over a first Wide Area Network (WAN) to communicate data between a first device and a second device where the first WAN including a low Earth orbit (LEO) satellite network. For instance, the head end router 112 establishes the primary communication link 122 over the WAN 104 that includes the LEO satellite network 106 and communicates the traffic stream 132.

At 504, the head end router 112 may establish a backup communication link over at least one of the first WAN or a second WAN. The backup communication link 130 may be established over the WAN 104 and through another communication link of the LEO satellite network 106, or may be through a different, backup WAN 128. In some instances, the backup communication link 130 is communicated over the second WAN 128, and the second WAN is a terrestrial WAN.

At 506, the head end router 112 may communicate a traffic stream between the first device and the second device using the primary communication link.

At 508, the head end router 112 may monitor performance of the primary communication link 122 during communication of the traffic stream 132 to generate performance data. In some instances, the head end router 112 may include a prediction component 408 that generates the performance data.

At 510, the head end router 112 may determine, using the performance data, an outage or impairment associated with the primary communication link. For instance, the prediction component 408 may use one or more predictive models 418 to predict that, based on the geographic location and the time of day, an outage or impairment is likely to occur (e.g., higher than a threshold chance of impairment or outage based on historical data). As anther example, the prediction component 408 may baseline the performance of the WAN 104 and/or LEO satellite network 106 and determine that current performance metrics are lower than the baseline performance by more than some threshold amount that indicates a need for replication.

At 512, the head end router 112 may, based at least in part on determining the outage or impairment, replicate a portion of the traffic stream 132 that is to be communicated via the primary communication link 122 to generate a replicated traffic stream 134. The replication may be performed using any replication technology or protocol to make copies of the packets in the traffic stream 132.

At 514, the head end router 112 may communicate the portion of the traffic stream 132 using the primary communication link 122 during a period of time. At 516, the head end router 112 may communicate the replicated traffic stream 134 using the backup communication link 130 at least partly during the period of time.

In some instances, the method 500 may include encapsulating first packets of the portion of the traffic stream with first replication wrappers. In such examples, the first replication wrappers (or encapsulation headers 206) include a source identifier (ID) 208 associated with a source router (head end router 112) of the traffic stream 132, a replication ID 210 associated with a replication session on the source router, the replication session including the traffic stream 132 and the replicated traffic stream 134, and replication counter values 212 that indicate first relative positions for each of the first packets in the traffic session. Further, the method 500 may include encapsulating second packets of the replicated traffic stream with second replication wrappers. In such examples, the second replication wrappers may include the source ID associated with the source router of the replicated traffic stream, the replication ID associated with the replication session on the source router, and the replication counter values that indicate second relative positions for each of the second packets in the replicated traffic stream.

In some instances, the method 500 may further include determining that the outage or impairment associated with the primary communication link 122 has cleared, and based at least in part on determining the outage or impairment has cleared, stopping the replicating of the traffic stream 132.

FIG. 6 illustrates a flow diagram of an example method 600 for a router to receive a traffic stream and a replicate traffic stream and determine which packets to forward to a destination.

At 602, the tail end router 120 may establish a primary communication link 122 over a first Wide Area Network (WAN) 104 with a head end router 112 to communicate data between a first device and a second device where the first WAN 104 includes a low Earth orbit (LEO) satellite network 106.

At 604, the tail end router 120 may establish a backup communication link, by the tail end router and with the head end router, over at least one of the first WAN or a second WAN.

At 606, the tail end router 120 may receive a traffic stream 132 via the primary communication link 122, and a replicated traffic stream 134 via the backup communication link 130. In some instances, first packets of the traffic stream 132 may be encapsulated with first replication wrappers including a source identifier (ID) associated with the head end router, a replication ID associated with a replication session on the head end router, the replication session including the traffic stream and the replicated traffic stream, and a replication counter values that indicate first relative positions for each of the first packets in the traffic session. Additionally, second packets of the replicated traffic stream 134 may be encapsulated with second replication wrappers including the source ID, the replication ID associated with a replication session on the head end router, and the replication counter values that indicate second relative positions for each of the second packets in the replicated traffic stream 134.

At 608, the tail end router 120 may receive the first packets of the traffic stream and the second packets of the replicated traffic stream, and at 610, the tail end router 120 may identify a first replication counter value in a first replication wrapper of a first packet, and forwarding, from the tail end router, the first packet of the first packets to the second device.

At 612, the tail end router 120 may store an indication that the first packet having the first replication counter value was forwarded from the remote router and to the second device.

At 614, the tail end router 120 may identify the first replication counter value in a second replication wrapper of a second packet, and at 616, the tail end router 120 may drop the second packet based at least in part on the indication that the first packet having the first replication counter value was forwarded from the remote router and to the second device.

Figure 7:
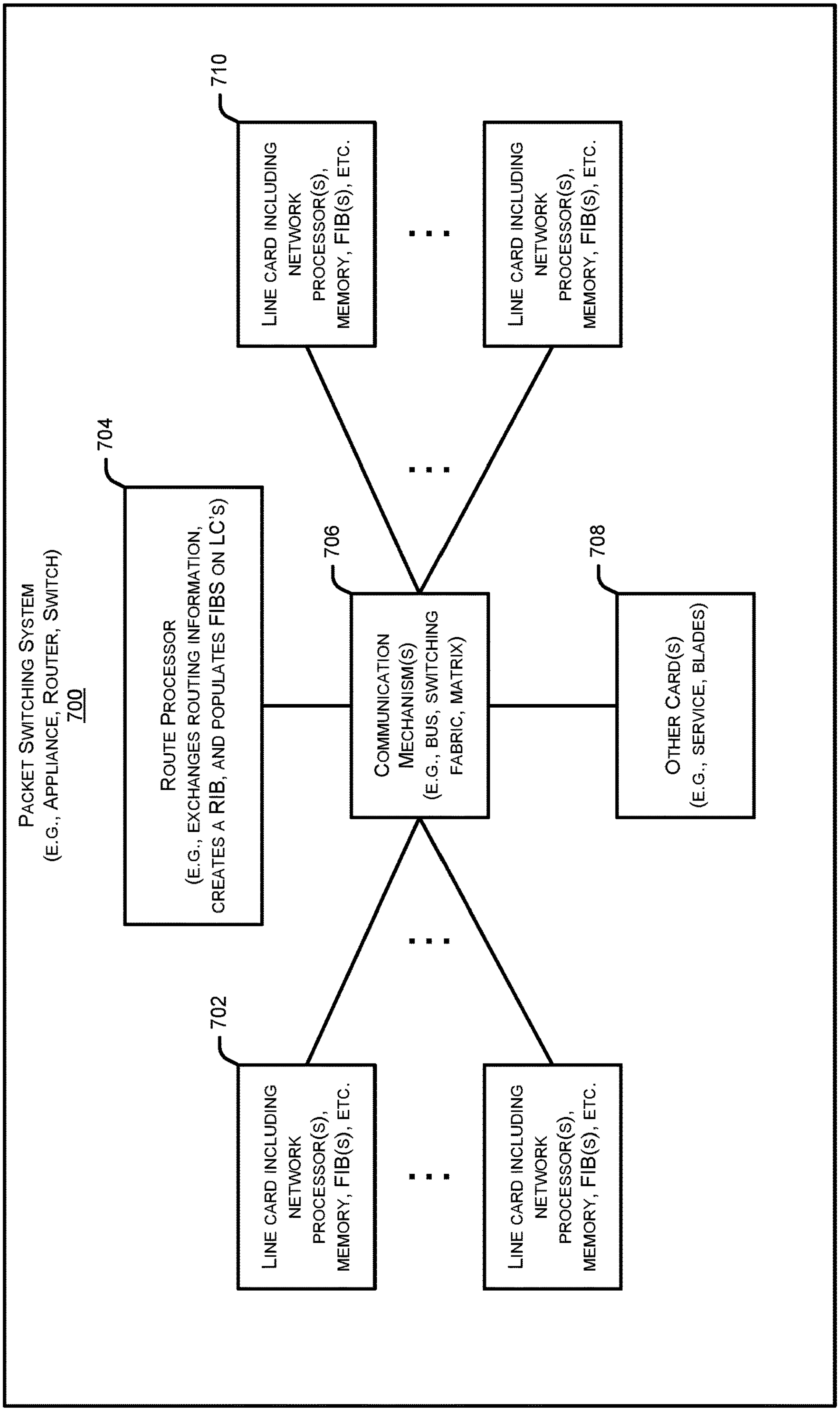
FIG. 7 illustrates a block diagram illustrating an example packet switching system that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks or devices, such as, for example, the head end router 112 and/or tail end router 120 as described with respect to the previous figures.

In some examples, a packet switching device 700 may comprise multiple line card(s) 702, 710, each with one or more network interfaces for sending and receiving packets over communications links (e.g., possibly part of a link aggregation group). The packet switching device 700 may also have a control plane with one or more processing elements 705 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities 702, 704, 708 and 710 to communicate. Line card(s) 702, 710 may typically perform the actions of being both an ingress and/or an egress line card 702, 710, in regard to multiple other particular packets and/or packet streams being received by, or sent from, packet switching device 700.

Figure 8:
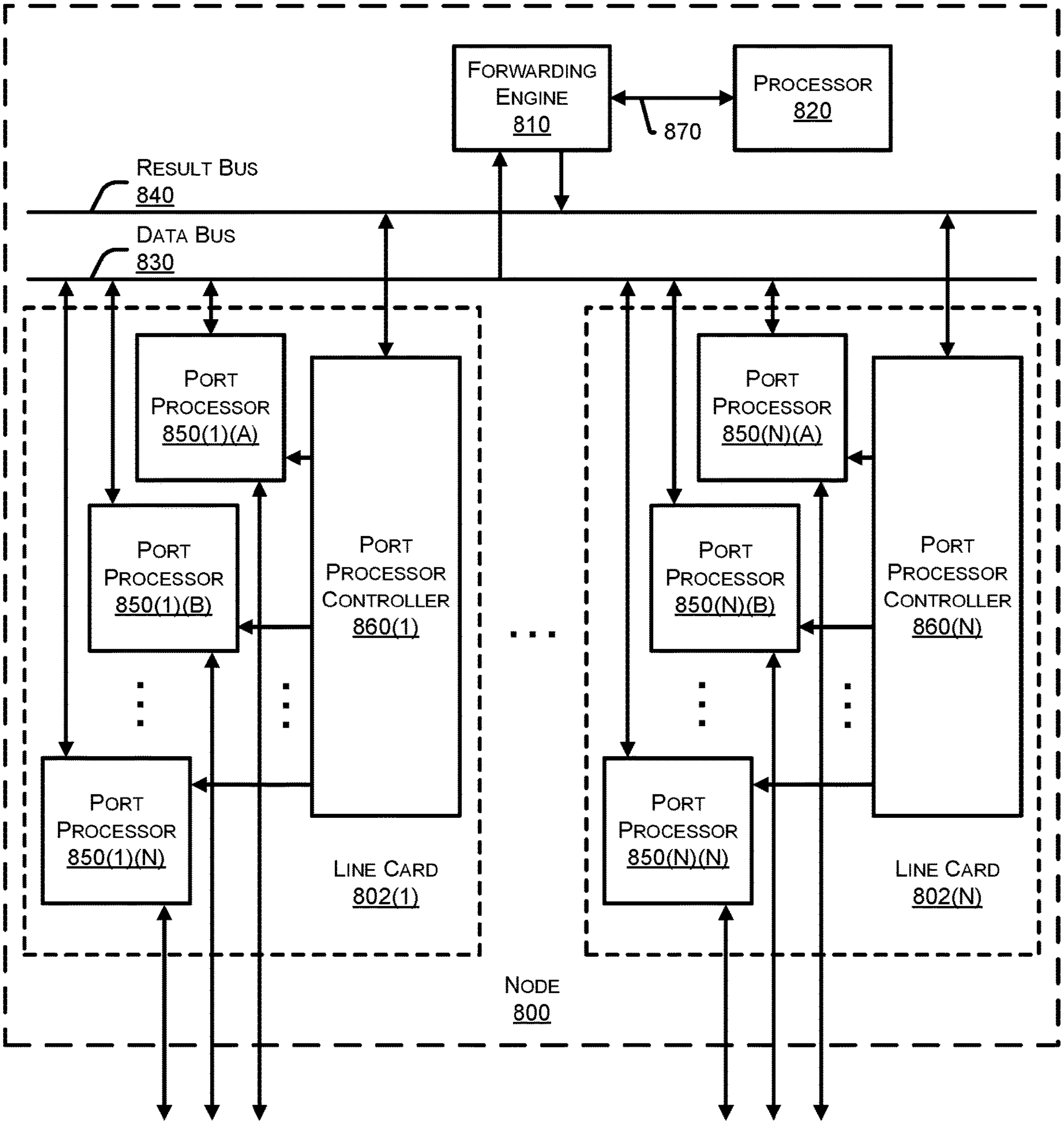
FIG. 8 illustrates a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various networks or devices, such as, for example, the head end router 112 and/or tail end router 120 as described with respect to the previous figures.

In some examples, node 800 may include any number of line cards 802 (e.g., line cards 802(1)-(N), where N may be any integer greater than 1) that are communicatively coupled to a forwarding engine 810 (also referred to as a packet forwarder) and/or a processor 820 via a data bus 830 and/or a result bus 840. Line cards 802(1)-(N) may include any number of port processors 880(1)(A)-(N)(N) which are controlled by port processor controllers 860(1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 880 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 880(1)(A)-(N)(N) at which the packet or packet and header was received and to one or more of those devices coupled to the data bus 830 (e.g., others of the port processor(s) 880(1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 880(1)(A)-(N)(N). This may be accomplished by indicating to corresponding one(s) of port processor controllers 860 (1)-(N) that the copy of the packet or packet and header held in the given one(s) of port processor(s) 880(1)(A)-(N)(N) should be forwarded to the appropriate one of port processor(s) 880(1)(A)-(N)(N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packets or packet and header's information, the addition of a digital signature, and/or some other information and/or processing capable of securing the packet or packet and header. On a node 800 receiving such a processed packet or packet and header, the corresponding process may be performed to recover or validate the packets or packet and header's information that has been secured.

Figure 9:
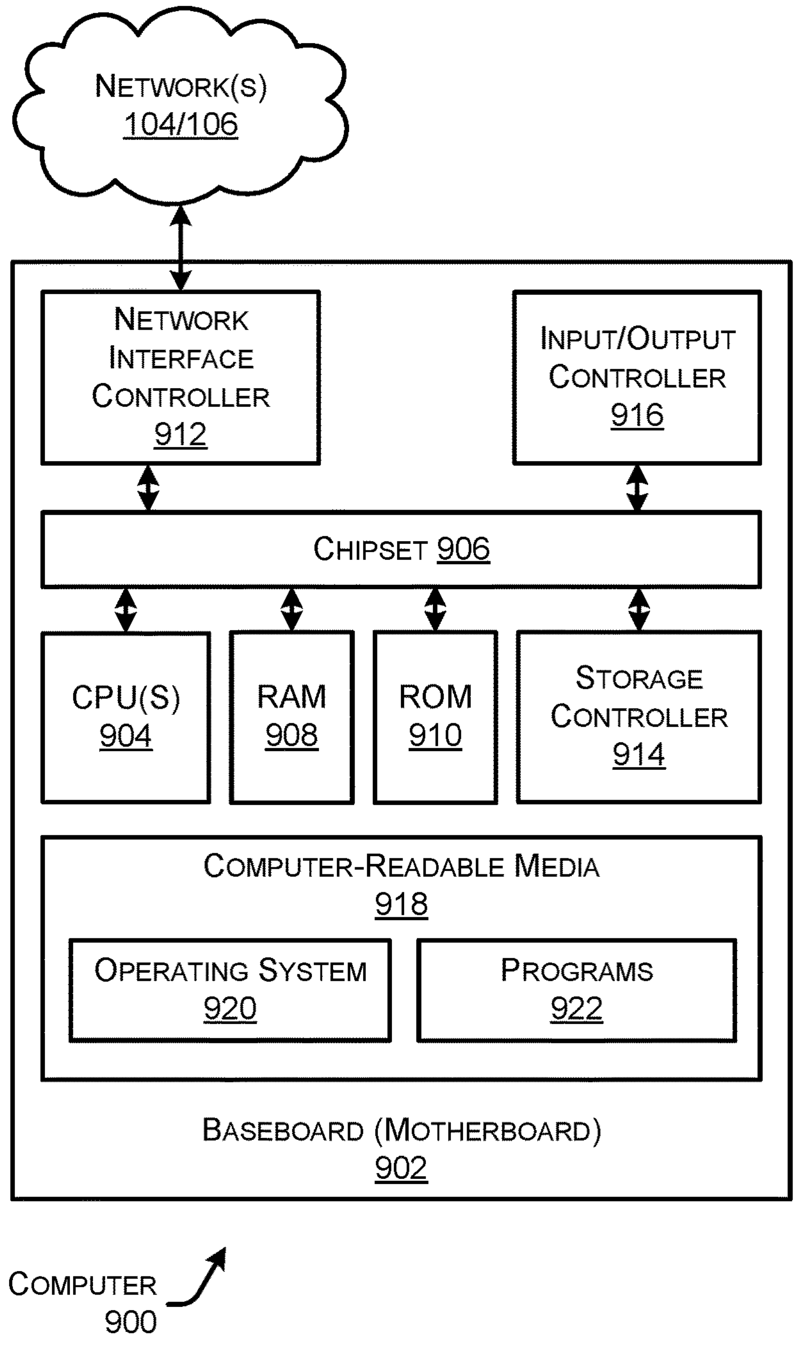
FIG. 9 is a computer architecture diagram showing an illustrative computer hardware architecture for implementing a computing device that can be utilized to implement aspects of the various technologies presented herein.

FIG. 9 is a computer architecture diagram showing an illustrative computer hardware architecture for implementing a computing device that can be utilized to implement aspects of the various technologies presented herein. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to a client device 102, the head end router 112, tail end router 120, and/or any other device described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the WAN 104 and/or WAN 128. The chipset 906 can include functionality for providing network connectivity through a NIC 912, such as a gigabit Ethernet adapter. The NIC 912 is capable of connecting the computer 900 to other computing devices over the WAN 104 and/or WAN 128. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by devices and/or any components included therein, may be supported by one or more devices similar to computer 900. Stated otherwise, some or all of the operations performed by the components included therein, may be performed by one or more computer devices 900 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants.

It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-6. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

establishing a primary communication link over a first Wide Area Network (WAN) to communicate data between a first device and a second device, the first WAN including a low Earth orbit (LEO) satellite network;

establishing a backup communication link over at least one of the first WAN or a second WAN;

communicating a traffic stream between the first device and the second device using the primary communication link;

monitoring performance of the primary communication link during communication of the traffic stream to generate performance data;

predicting, using the performance data, that an outage or impairment associated with the primary communication link is to occur at a future time;

based at least in part on predicting the outage or impairment and prior to the future time, proactively replicating a portion of the traffic stream that is to be communicated via the primary communication link to generate a replicated traffic stream;

encapsulating first packets of the portion of the traffic stream with first replication wrappers, the first replication wrappers including:

a source identifier (ID) associated with a source router of the traffic stream;

a replication ID associated with a replication session on the source router, the replication session including the traffic stream and the replicated traffic stream; and replication counter values that indicate first relative positions for each of the first packets in the traffic session;

encapsulating second packets of the replicated traffic stream with second replication wrappers, the second replication wrappers including:

the source ID associated with the source router of the replicated traffic stream;

the replication ID associated with the replication session on the source router; and the replication counter values that indicate second relative positions for each of the second packets in the replicated traffic stream;

communicating the portion of the traffic stream using the primary communication link during a period of time; and communicating the replicated traffic stream using the backup communication link at least partly during the period of time.

2. The method of claim 1, further comprising:

determining that the outage or impairment associated with the primary communication link has cleared;

based at least in part on determining the outage or impairment has cleared, stopping the replicating of the traffic stream and stopping communicating the replicated traffic stream; and communicating the traffic stream using the primary link and not the backup communication link.

3. The method of claim 1, further comprising:

receiving, at a remote router associated with the second device, the first packets of the traffic stream and the second packets of the replicated traffic stream;

identifying, at the remote router, a first replication counter value in a first replication wrapper of a first packet;

forwarding, from the remote router, the first packet of the first packets to the second device;

storing an indication that the first packet having the first replication counter value was forwarded from the remote router and to the second device;

identifying the first replication counter value in a second replication wrapper of a second packet; and dropping the second packet based at least in part on the indication that the first packet having the first replication counter value was forwarded from the remote router and to the second device.

4. The method of claim 1, further comprising:

determining that the outage or impairment associated with the primary communication link has cleared; and based at least in part on determining the outage or impairment has cleared, stopping encapsulation of subsequent packets in the traffic stream.

5. The method of claim 1, wherein:

the backup communication link is communicated over the second WAN; and the second WAN is a terrestrial WAN.

6. The method of claim 1, wherein the establishing of the primary communication link and the backup communication link, the monitoring the performance of the primary communication link, and the replicating of the portion of the traffic stream are performed by a proxy running on a routing device associated with the first device.

7. The method of claim 1, wherein the establishing of the primary communication link and the backup communication link, the monitoring the performance of the primary communication link, and the replicating of the portion of the traffic stream are performed by a client running on the first device.

8. A routing device that acts as a proxy for a client device, the routing device comprising:
- one or more processors; and
- one or more non-transitory computer-readable media storing computer-executable instructions that, when executed by the one or more processors, cause the one or more processors to perform operations comprising:
- establishing a primary communication link over a first Wide Area Network (WAN) to communicate data between the client device and a remote device, the first WAN including a low Earth orbit (LEO) satellite network;
- establishing a backup communication link with the remote device over at least one of the first WAN or a second WAN;
- communicating a traffic stream between the client device and the remote device using the primary communication link;
- monitoring performance of the primary communication link during communication of the traffic stream to generate performance data;
- predicting, using the performance data, that an outage or impairment associated with the primary communication link is to occur at a future time;
- based at least in part on predicting the outage or impairment and prior to the future time, proactively replicating a portion of the traffic stream that is to be communicated via the primary communication link to generate a replicated traffic stream;
- encapsulating first packets of the portion of the traffic stream with first replication wrappers, the first replication wrappers including:
  - a source identifier (ID) associated with a source router of the traffic stream;
  - a replication ID associated with a replication session on the source router, the replication session including the traffic stream and the replicated traffic stream; and
  - replication counter values that indicate first relative positions for each of the first packets in the traffic session;
- encapsulating second packets of the replicated traffic stream with second replication wrappers, the second replication wrappers including:
  - the source ID associated with the source router of the replicated traffic stream;
  - the replication ID associated with the replication session on the source router; and
  - the replication counter values that indicate second relative positions for each of the second packets in the replicated traffic stream;
- communicating the portion of the traffic stream using the primary communication link during a period of time; and
- communicating the replicated traffic stream using the backup communication link at least partly during the period of time.

9. The routing device of claim 8, the operations further comprising:
- determining that the outage or impairment associated with the primary communication link has cleared;
- based at least in part on determining the outage or impairment has cleared, stopping the replicating of the traffic stream and stopping communicating the replicated traffic stream; and
- communicating the traffic stream using the primary link and not the backup communication link.

10. The routing device of claim 8, the operations further comprising:
- receiving, at the remote device, the first packets of the traffic stream and the second packets of the replicated traffic stream;
- identifying, at the remote device, a first replication counter value in a first replication wrapper of a first packet;
- forwarding, from the remote device, the first packet of the first packets to a destination device;
- storing an indication that the first packet having the first replication counter value was forwarded from the remote device and to the destination device;
- identifying the first replication counter value in a second replication wrapper of a second packet; and
- dropping the second packet based at least in part on the indication that the first packet having the first replication counter value was forwarded from the remote device and to the destination device.

11. The routing device of claim 8, the operations further comprising:
- determining that the outage or impairment associated with the primary communication link has cleared; and
- based at least in part on determining the outage or impairment has cleared, stopping encapsulation of subsequent packets in the traffic stream.

12. The routing device of claim 8, wherein:
- the backup communication link is communicated over the second WAN; and
- the second WAN is a terrestrial WAN.

13. One or more non-transitory computer-readable media storing computer-executable instructions that, when executed by one or more processors, cause the one or more processors to perform operations comprising:
- establishing a primary communication link over a first Wide Area Network (WAN) to communicate data between a first device and a second device, the first WAN including a low Earth orbit (LEO) satellite network;
- establishing a backup communication link over at least one of the first WAN or a second WAN;
- communicating a traffic stream between the first device and the second device using the primary communication link;
- monitoring performance of the primary communication link during communication of the traffic stream to generate performance data;
- predicting, using the performance data, that an outage or impairment associated with the primary communication link is to occur at a future time;
- based at least in part on predicting the outage or impairment and prior to the future time, proactively replicating a portion of the traffic stream that is to be communicated via the primary communication link to generate a replicated traffic stream;

encapsulating first packets of the portion of the traffic stream with first replication wrappers, the first replication wrappers including:

a source identifier (ID) associated with a source router of the traffic stream;

a replication ID associated with a replication session on the source router, the replication session including the traffic stream and the replicated traffic stream; and replication counter values that indicate first relative positions for each of the first packets in the traffic session; and encapsulating second packets of the replicated traffic stream with second replication wrappers, the second replication wrappers including:

the source ID associated with the source router of the replicated traffic stream;

the replication ID associated with the replication session on the source router; and the replication counter values that indicate second relative positions for each of the second packets in the replicated traffic stream;

communicating the portion of the traffic stream using the primary communication link during a period of time; and communicating the replicated traffic stream using the backup communication link at least partly during the period of time.

14. The one or more non-transitory computer-readable media of claim 13, the operations further comprising:

determining that the outage or impairment associated with the primary communication link has cleared;

based at least in part on determining the outage or impairment has cleared, stopping the replicating of the traffic stream and stopping communicating the replicated traffic stream; and communicating the traffic stream using the primary link and not the backup communication link.

15. The one or more non-transitory computer-readable media of claim 13, the operations further comprising:

receiving, at a remote router associated with the second device, the first packets of the traffic stream and the second packets of the replicated traffic stream;

identifying, at the remote router, a first replication counter value in a first replication wrapper of a first packet;

forwarding, from the remote router, the first packet of the first packets to the second device;

storing an indication that the first packet having the first replication counter value was forwarded from the remote router and to the second device;

identifying the first replication counter value in a second replication wrapper of a second packet; and dropping the second packet based at least in part on the indication that the first packet having the first replication counter value was forwarded from the remote router and to the second device.

16. The one or more non-transitory computer-readable media of claim 13, wherein the establishing of the primary communication link and the backup communication link, the monitoring the performance of the primary communication link, and the replicating of the portion of the traffic stream are performed by a proxy running on a routing device associated with the first device.

17. The one or more non-transitory computer-readable media of claim 13, wherein the establishing of the primary communication link and the backup communication link, the monitoring the performance of the primary communication link, and the replicating of the portion of the traffic stream are performed by a client running on the first device.

* * * * *